(12) United States Patent
Hawley et al.

(10) Patent No.: US 10,507,820 B2
(45) Date of Patent: Dec. 17, 2019

(54) VEHICLE MASS AND ROAD LOAD ESTIMATION IN AN EV CONDITION

(71) Applicant: Toyota Motor Engineering & Manufacturing North America, Inc., Plano, TX (US)

(72) Inventors: Thomas S. Hawley, Ann Arbor, MI (US); Shingo Eto, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 181 days.

(21) Appl. No.: 15/669,854

(22) Filed: Aug. 4, 2017

(65) Prior Publication Data

US 2019/0039595 A1    Feb. 7, 2019

(51) Int. Cl.
| | |
|---|---|
| *B60W 20/12* | (2016.01) |
| *G01P 15/18* | (2013.01) |
| *G01G 19/02* | (2006.01) |
| *B60L 15/20* | (2006.01) |
| *B60W 10/06* | (2006.01) |
| *B60W 10/08* | (2006.01) |
| *B60W 20/30* | (2016.01) |
| *B60W 40/072* | (2012.01) |

(Continued)

(52) U.S. Cl.
CPC ......... *B60W 20/12* (2016.01); *B60L 15/2036* (2013.01); *B60L 15/2045* (2013.01); *B60W 10/06* (2013.01); *B60W 10/08* (2013.01); *B60W 20/30* (2013.01); *B60W 40/072* (2013.01); *B60W 40/105* (2013.01); *G01G 19/02* (2013.01); *G01G 19/086* (2013.01); *G01P 15/18* (2013.01); *B60L 2240/12* (2013.01); *B60L 2240/16* (2013.01); *B60L 2240/423* (2013.01); *B60L 2240/44* (2013.01); *B60L 2260/42* (2013.01); *B60W 2520/10* (2013.01); *B60W 2550/142* (2013.01); *B60W 2710/0666* (2013.01); *B60W 2710/083* (2013.01); *B60W 2720/106* (2013.01); *Y10S 903/93* (2013.01)

(58) Field of Classification Search
CPC ...... B60W 20/12; B60W 10/06; B60W 10/08; B60W 20/30; B60L 15/2036; B60L 15/2045
See application file for complete search history.

(56) References Cited

U.S. PATENT DOCUMENTS

| | | |
|---|---|---|
| 5,832,396 A | 11/1998 | Moroto |
| 8,374,740 B2 | 2/2013 | Druenert |

(Continued)

FOREIGN PATENT DOCUMENTS

EP    1215071    9/2005

*Primary Examiner* — Michael D Lang
(74) *Attorney, Agent, or Firm* — Sheppard, Mullin, Richter & Hampton LLP; Hector A. Agdeppa; Daniel N. Yannuzzi

(57) ABSTRACT

Systems and methods provide accurate determinations of relevant vehicle mass that can take into account any load being carried and/or towed by a vehicle, such as an electric vehicle or hybrid vehicle. Systems and methods also provide accurate road load measurements that can take into account road gradient(s) and the impact of gravity. Accordingly, the dynamic nature of relevant vehicle mass and road load can be captured. Efforts to optimize operation and/or take preemptive action to provide more efficient performance, enhance the drive experience, etc. can be better achieved through the more accurate determinations of relevant vehicle mass and road load achieved by these systems and methods.

18 Claims, 7 Drawing Sheets

(51) Int. Cl.
*B60W 40/105* (2012.01)
*G01G 19/08* (2006.01)

(56) References Cited

U.S. PATENT DOCUMENTS

| | | |
|---|---|---|
| 8,566,013 B2 | 10/2013 | Davis |
| 9,039,568 B2 | 5/2015 | Banker |
| 9,052,013 B2 | 6/2015 | Landes |
| 9,205,841 B2 | 12/2015 | Williams |
| 9,211,804 B2 | 12/2015 | Preece |
| 9,464,407 B2 | 10/2016 | Stutchbury |
| 9,561,792 B2 | 2/2017 | Kodawara |
| 2004/0167705 A1 | 8/2004 | Lingman |
| 2010/0090650 A1 | 4/2010 | Yazami |
| 2011/0106388 A1 | 5/2011 | Boeckenhoff |
| 2013/0096808 A1 | 4/2013 | DeLaSalle |
| 2013/0204490 A1 | 8/2013 | Pfefferl |
| 2014/0088810 A1 | 3/2014 | Gehring |
| 2014/0114514 A1 | 4/2014 | Crombez |
| 2014/0148986 A1 | 5/2014 | Yoshikawa |
| 2014/0244120 A1 | 8/2014 | Fujii |
| 2015/0046076 A1 | 2/2015 | Costello |
| 2016/0109328 A1 | 4/2016 | Kanke |
| 2016/0137185 A1 | 5/2016 | Morisaki |
| 2016/0200315 A1 | 7/2016 | Fracchia |
| 2016/0243947 A1 | 8/2016 | Perkins |
| 2016/0243958 A1 | 8/2016 | Miller |
| 2016/0244044 A1 | 8/2016 | Miller |
| 2016/0264144 A1 | 9/2016 | Fontvieille |
| 2017/0021730 A1 | 1/2017 | Ogawa |
| 2017/0021820 A1 | 1/2017 | Ogawa |
| 2017/0021823 A1 | 1/2017 | Ogawa |
| 2017/0355358 A1 | 12/2017 | Ogawa |
| 2018/0001884 A1 | 1/2018 | Itagaki |
| 2018/0010529 A1 | 1/2018 | Xiao |
| 2018/0065619 A1 | 3/2018 | Kim |
| 2018/0073593 A1 | 3/2018 | Kawamura |
| 2018/0093655 A1 | 4/2018 | Healy |
| 2018/0162382 A1 | 6/2018 | Colavincenzo |
| 2018/0178774 A1 | 6/2018 | Katsumata |
| 2018/0236994 A1 | 8/2018 | Healy |
| 2018/0257473 A1 | 9/2018 | Follen |

VEHICLE MASS AND ROAD LOAD ESTIMATION IN AN EV CONDITION

TECHNICAL FIELD

The present disclosure relates generally to calculating vehicle mass and road load. In some embodiments, vehicle mass and road load may be calculated while the vehicle is in a motor-only travel mode.

DESCRIPTION OF RELATED ART

Hybrid vehicles and electric vehicles have become increasingly popular among consumers concerned with their environmental impact and with increasing fuel economy. Hybrid vehicles generally utilize an engine, e.g., an internal combustion engine, along with an electric motor, which can also operate as a generator to provide energy to a battery that powers the electric motor. Hybrid vehicles can use an engine clutch that connects/disconnects the engine to/from a drivetrain. The drivetrain can include the engine and electric motor, and a transmission coupled to the electric motor for transmitting power from the engine, electric motor, or both.

Electric vehicles utilize only electric motors to provide drive power. Generally, electric vehicles incorporate two electric motors to provide drive power, where a clutch, similar to the engine clutch connects/disconnects one or the other electric motor depending on a desired travel mode. The drivetrain, similar to that of a hybrid vehicle, minus the engine, may include the electric motor(s) and various drive gears.

In conventional hybrid or engine-only vehicles, vehicle mass and road load determination can be inaccurate due to torque variations, e.g., resulting from the air intake of an internal combustion engine, the fuel injection mechanism, etc. Moreover, engines in hybrid or engine-only vehicles must connect to the drivetrain via a lock-up clutch, which may also lead of torque variations. Some conventional hybrid or engine-only vehicles determine, e.g., vehicle mass via lookup tables, or other methods of estimation that are not based on actual, operating conditions/characteristics of the vehicle. Thus, any determinations that are made to, e.g., optimize operation of the vehicle are not as accurate as they could be. Additionally, conventional hybrid or engine-only vehicles do not take into account the impact of gravity, vis-à-vis road gradients, when determining vehicle mass and road load. Again, any optimization techniques relying on determinations of vehicle mass and/or road load can be negatively impacted due to the inaccurate methods of determining vehicle mass and/or road load. For example, without considering the impact of gravity, the gear in which a conventional hybrid or engine-only vehicle operates may be unnecessarily low or high depending on the road gradient.

BRIEF SUMMARY OF THE DISCLOSURE

In accordance with one embodiment, a method comprises determining relevant mass of a vehicle during a low speed condition while the vehicle is powered only by an electric motor. The method may further comprise calculating road load associated with the vehicle based on the relevant mass of the vehicle, current acceleration or deceleration of the vehicle, and current drive force of the vehicle. Further still, the method may comprise dynamically adjusting the current drive force of the vehicle based upon the relevant mass of the vehicle, the road load associated with the vehicle, and current road grade. The dynamic adjustment is at least one of a response to at least one of a current road condition and a current operating characteristic of the vehicle, and a preemptive action in anticipation of at least one of an upcoming road condition and an upcoming operating characteristic of the vehicle.

In some embodiments, the vehicle comprises a hybrid electric vehicle or an electric vehicle, and the hybrid electric vehicle further comprising an internal combustion engine.

In some embodiments, determining the relevant mass of the vehicle comprises calculating the relevant mass as a function of the current drive force generated by the electric motor and a current rate of acceleration or deceleration. In some embodiments, the method may further comprise measuring the current drive force as a function of force due to negative motor torque and force due to friction braking while the vehicle is in a deceleration condition. In some embodiments, determining the relevant mass of the vehicle further comprises determining whether the vehicle is traversing a graded condition. In some embodiments, the method may further comprise obtaining and applying a road grade correction factor to the relevant mass by calculating force attributed to the grade and adding the force attributed to the grade to the current drive force generated by the electric motor upon a determination that the vehicle is traversing the grade. In some embodiments, the low speed condition comprises a condition during which the vehicle is traveling below approximately 30 kilometers per hour. In some embodiments, the method may further comprise utilizing the relevant mass of the vehicle as the relevant mass when dynamically adjusting the current drive force upon a determination that the vehicle is not traversing the grade.

In some embodiments, the method may further comprise determining the road load upon a determination that the vehicle is traveling above approximately 30 kph. In some embodiments, determining the road load comprises calculating the road load as a function of the current drive force generated by the electric motor, the relevant mass of the vehicle, and force due to gravity.

In some embodiments, the method may further comprise determining the relevant mass of the vehicle while the vehicle is in an acceleration condition, and the vehicle is traveling at a speed less than approximately 30 kilometers per hour. In some embodiments, the method may further comprise determining torque generated by the electric motor. In some embodiments, the current drive force is calculated as a function of the torque generated by the electric motor, and a torque multiplication factor associated with a gear ratio of a torque converter of the vehicle. The current drive force may further be a function of a value indicative of drivetrain efficiency, the gear ratio, a differential gear ratio associated with a differential gear device of the vehicle, and a radius of a wheel of the vehicle. In some embodiments, the method may further comprise determining the torque generated by the electric motor subsequent to a launch condition at a time when the torque converter is in a taut state.

In some embodiments, the low speed condition comprises a speed of the vehicle determined at a time when launch inertia no longer contributes to the speed of the vehicle.

In some embodiments, the relevant mass of the vehicle comprises a mass of the vehicle and one or more loads, the one or more loads being at least one of carried and towed by the vehicle.

In accordance with one embodiment, a vehicle may comprise one or more electric motors, and an electronic control unit. The electronic control unit may be adapted to determine that the vehicle is operating in a travel mode during which only the one or more electric motors are being used to drive the vehicle. The electronic control unit may be adapted to determine a relevant mass of the vehicle based upon the drive force generated by the one or more motors and calculated at the wheels of the vehicle. The electronic control unit may be adapted to determine a road load associated with the vehicle as a function of the relevant mass of the vehicle.

In some embodiments, the electronic control unit repeatedly determines the road load during operation of the vehicle. Based upon the repeated determinations, the electronic control unit generates a road load profile for the vehicle, the determination of the road load being a function of gravitational impact on the vehicle in addition to being a function of the relevant mass of the vehicle.

In some embodiments, the electronic control unit determines the relevant mass of the vehicle as a function of the drive force generated by the one or more motors and a rate of acceleration or deceleration of the vehicle if the vehicle is traveling a level section of road.

In some embodiments, the electronic control unit determines the relevant mass of the vehicle as a function of the drive force generated by the one or more motors, a rate of acceleration or deceleration of the vehicle, and road gradient if the vehicle is traveling downhill. In some embodiments, the electronic control unit determines the relevant mass of the vehicle and the road load associated with the vehicle after passage of a launch condition.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments of the present disclosure are directed to determining a relevant vehicle mass, which may include a towed load, and road load associated with a vehicle, such as an electric vehicle or a hybrid vehicle. As alluded to above, torque variations due to operational characteristics of an engine in engine-only or hybrid vehicles can result in inaccurate determinations of a relevant vehicle mass and road load. Such inaccuracies can also be the result of failing to consider the impact of gravity on relevant vehicle mass and road load.

Accordingly, various embodiments can calculate relevant vehicle mass and road load in a hybrid vehicle or electric vehicle while the vehicle is in an electric motor (referred to herein simply as a motor)-only travel mode. When relevant vehicle mass and road load are calculated during a motor-only travel mode, the results are more accurate. That is, calculations performed to determine relevant vehicle mass and road load can depend on drivetrain measurements, such as drivetrain force described below. Because the motor (or possibly motors in the case of some electric vehicles) are generally connected directly to the drivetrain, such measurements are not susceptible to the inaccuracies that plague the same measurements when performed on an engine.

Moreover, the determination of relevant vehicle mass and road load can occur continuously or at least periodically/aperiodically while a vehicle is traveling. In the case of road load, a road load profile including a plurality of measured data points can be generated, also leading to more accurate and/or relevant road load determinations. Additionally still, the impact of gravity on relevant vehicle mass and road load can be determined to further increase accuracy of relevant vehicle mass and road load determinations, when measurements are performed while the vehicle is traversing a gradient, e.g., uphill or downhill slope.

Figure 1A:
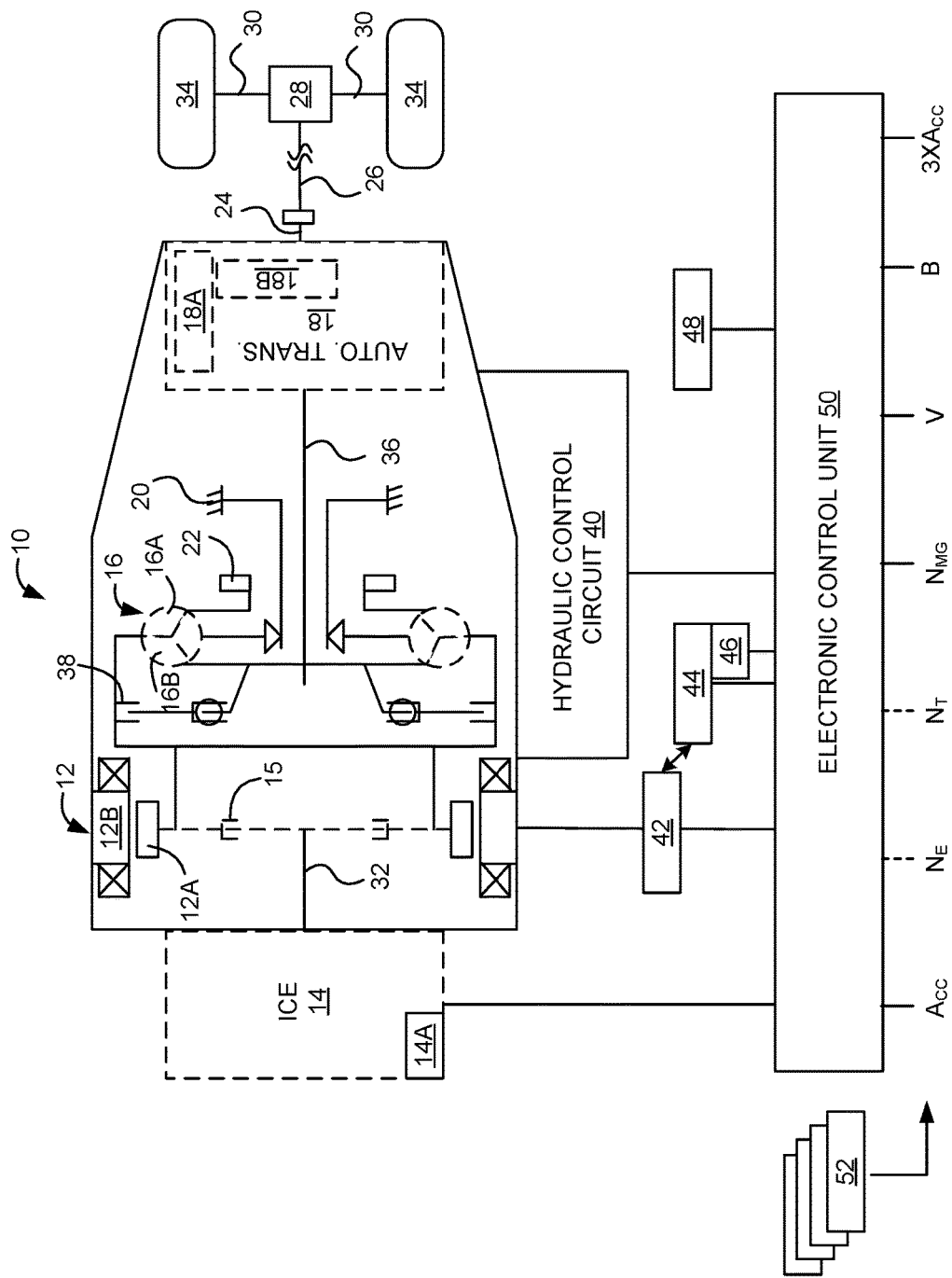
FIG. 1A is a schematic representation of a hybrid vehicle in which deceleration control can be implemented in accordance with various embodiments of the present disclosure.

FIG. 1A is a schematic representation of an example hybrid and/or electric vehicle 10 in which deceleration control in accordance with various embodiments may be implemented. It should be noted that for clarity of the illustration, not all elements of vehicle 10 are labeled with a reference numeral. For example, in some cases, only one of two or more elements or components of vehicle 10 are labeled with a reference numeral. However, it can be assumed that the functionality and/or operation of similarly-illustrated elements or components are the same or similar, as would understood by those of ordinary skill in the art unless described otherwise. Moreover, aspects of vehicle 10 may be described from the perspective of one/one set of elements or components. It can be assumed that secondary instances of those elements or components may operate the same or in a similar manner. It should also be noted that for ease of description and clarity of figures, not all components of a vehicle have been illustrated, and that the figures and corresponding descriptions are not meant to be limiting. It should be further noted that a vehicle may embody certain variations with respect to its elements or components, which are contemplated herein. For example vehicle 10 may be configured with only a single motor.

As indicated previously, various embodiments are directed to determining relevant vehicle mass and road load while a vehicle is in an EV mode. Accordingly, the disclosed techniques are applicable not only to hybrid vehicles, but to electric vehicles that are driven solely by a motor(s) as well. However, it should be understood that the component makeup and operation of an electric vehicle is similar or can be likened to that of a hybrid vehicle, e.g., without the engine and/or any component parts relating to the engine. For example, the drivetrain of an electric vehicle may not include an automatic transmission, e.g., automatic transmission 18. Instead, a single speed reduction gear used in conjunction with motor 12 may replace differential gear device 28 described below. This is because motors can create a sufficient amount of torque over a broad powerband (range of RPMs). Accordingly, a conventional automatic transmission, for example, is not necessarily needed. To reflect this, FIG. 1A illustrates certain components, e.g., engine 14, automatic transmission 18, etc. with dashed lines to indicate that they may be included when FIG. 1A is referenced to describe a hybrid vehicle, but absent when FIG. 1A reflects an electric vehicle.

FIG. 1A includes an example drive system of a vehicle 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case 20. The transmission case 20 may be a splittable case made of aluminum die cast parts, for example, and fixed to a non-rotating member such as a vehicle body.

As a hybrid vehicle, vehicle 10 may be driven/powered with at least one of the engine 14 and the motor 12 as the drive source for travel. In other words, any one of a plurality of travel modes can be selectively established in the hybrid vehicle 10. A first travel mode may be an engine-only travel mode that only uses the engine 14 as the drive source for travel. A second travel mode may be an EV travel mode that only uses the motor 12 as the drive source for travel. A third travel mode may be an HEV hybrid travel mode that uses the engine 14 and the motor 12 as drive sources for travel. In the engine-only and HEV travel modes, hybrid vehicle 10 travels by using the driving force generated at least by engine 14 while a clutch 15 is engaged. In EV travel mode, hybrid vehicle 10 travels by using the driving force generated by motor 12 while the engine 14 is stopped and clutch 15 is disengaged.

Engine 14 can be an internal combustion engine such as a gasoline engine or a diesel engine of an in-cylinder injection type, where fuel is injected directly into a combustion chamber. An output control device 14A is provided to control drive (output torque) of the engine 14. The output control device 14A includes a throttle actuator that controls opening and closing of an electronic throttle valve, a fuel injection device that controls fuel injection, an ignition device that controls ignition timing, and the like. The output control device 14A executes output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A lock-up clutch 38 that directly connects a pump impeller 16A and a turbine wheel 16B so that they can integrally rotate is provided between pump impeller 16A and the turbine wheel 16B of torque converter 16. The lock-up clutch 38 can be controlled such that its engagement state becomes any one of engagement (complete engagement), slip engagement, and disengagement (complete disengagement) according to hydraulic pressure supplied from a hydraulic control circuit 40. A mechanical hydraulic pump 22 is coupled to the pump impeller 16A of the torque converter 16, and hydraulic pressure generated by hydraulic pump 20 is supplied to hydraulic control circuit 40 as source pressure along with rotation of the pump impeller 16A. Turbine wheel 16B may be coupled to a transmission input shaft 36 that transfers power from motor 12 and/or engine 14 to automatic transmission 18 to which a transmission output shaft 24 is attached. Connected to transmission output shaft 24 is a propeller shaft 26 coupled to differential gear device 28.

Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches 18B and brakes 18A whose engagement is controlled by a hydraulic actuator. These hydraulic frictional engagement devices are selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 can be used to provide drive power in vehicle 10, wherein vehicle 10 may be a hybrid vehicle or an electric vehicle. Motor 12 may include a rotor 12A and a stator 12B. Rotor 12A can be rotatably supported around an axis by the transmission case 20. Stator 12B can be integrally fixed to the transmission case 20 on an outer peripheral side of the rotor 12A. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below controls inverter 42, adjusts driving current supplied to or received from coils of the motor 12, and controls driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to the rotor 12A of the motor 12 via clutch 15. Rotor 30 of the motor MG is coupled to a front cover that is an input member of the torque converter 16. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

Vehicle 10 may include an electronic control unit 50. Electronic control unit 50 may include a microcomputer that includes a CPU, a RAM, a ROM, an input-output interface, and the like. In electronic control unit 50, the CPU utilizes a temporary storage function of the RAM to perform signal processing according to a program in advance stored in the ROM. Accordingly, the electronic control unit 50 executes various kinds of control such as drive control of the engine 14, drive control of the motor 12, speed change control of the automatic transmission 18, engagement force control of the clutch 15, engagement control of the lock-up clutch 38, and the like. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the vehicle 10.

As shown in FIG. 1A, the electronic control unit 50 is supplied with various kinds of input signals detected by each sensor provided in the hybrid vehicle 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and energy storage amount (remaining capacity, charged amount), e.g., battery SOC of battery 44. It should be noted that more signals indicative of other operational aspects of vehicle 10 can be received by electronic control unit 50, e.g., a temperature of motor 12, coolant temperature of hybrid vehicle 10, intake air amount of engine 14, etc.

Electronic control unit 50 can receive the input signals from various sensors 52 configured to sense relevant operational characteristics of vehicle 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_E$ can be detected by an engine revolution speed sensor. The turbine rotational speed $N_T$ can be detected by a turbine rotational speed sensor. The motor rotational speed $N_{MG}$ can be detected by a motor rotational speed sensor. Vehicle speed V can be detected by a vehicle speed sensor. Battery SOC can be detected by an SOC sensor 46. Another example of a sensor 52 may be a positioning or location sensor, such as a Global Positioning System (GPS) receiver that can provide location information corresponding to a location of vehicle 10.

Still another example of a sensor 52 may be a 3-axis accelerometer. The 3-axis accelerometer can be used to determine acceleration of vehicle 10, as well as, e.g., the tilt experienced by hybrid vehicle 10 while being driven. In accordance with various embodiments, the acceleration of vehicle 10 determined by the 3-axis accelerometer can send a control signal(s) to electronic control unit 50 indicative of the current rate of acceleration. This rate of acceleration can be used when determining relevant vehicle mass and/or road load in accordance with various embodiments described below. In some embodiments, the 3-axis accelerometer can be utilized to determine a gradient of a road being traveled by vehicle 10, rather than electronic control unit 50 receiving road gradient information from, e.g., a navigation information service provider described below.

Additionally, electronic control unit 50 can receive input signals from a network interface device 48. Network interface device 48 may receive information such as map data, road conditions information (e.g., upcoming road slope/gradient information, upcoming turn information, etc.), traffic information, and the like from one or more information service providers. Instead of relying solely on a GPS receiver, a location of vehicle 10 may be determined from information received by network interface device 48.

Electronic control unit 50 can supply various output signals to one or more devices/components/elements provided in vehicle 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15. Electronic control unit 50 can also supply signals to the linear solenoid valve in the hydraulic control circuit 40 for engagement control of the lock-up clutch 38, line pressure control, and the like.

Figure 1B:
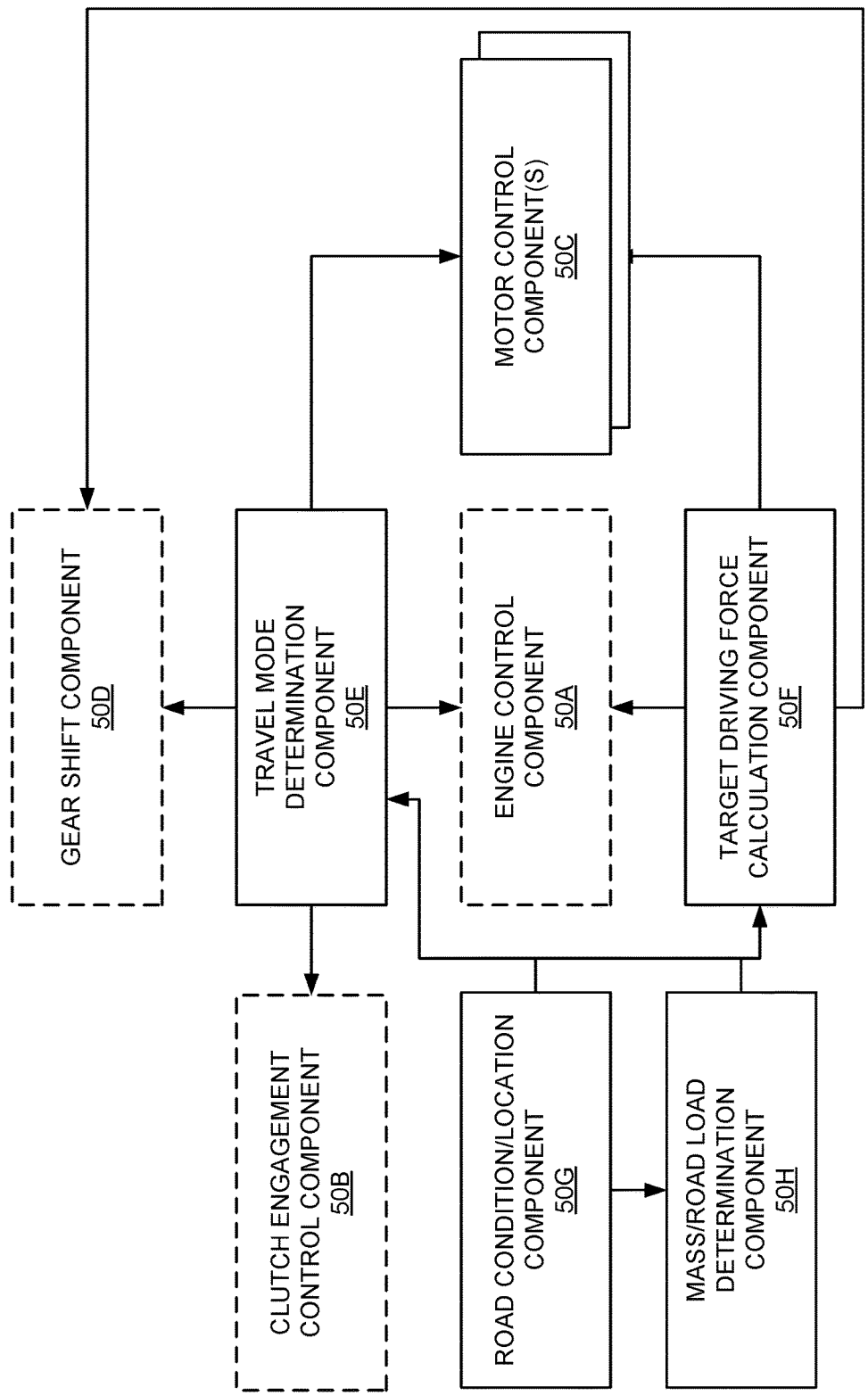
FIG. 1B is a functional block diagram illustrates component parts of a control function included in an electronic control unit of the hybrid vehicle illustrated in FIG. 1A.

FIG. 1B is a functional block diagram that illustrates example parts of a control function included in the electronic control unit 50. Like FIG. 1A, FIG. 1B can be representative of an electronic control unit implemented in both an electric vehicle and a hybrid vehicle. For example, an electronic control unit in an electric vehicle, may not require engine control component 50A, gear shift component 50D, nor clutch engagement control component 50B. In electric vehicles, where multiple motors are used, motor control component 50C described below may be used to control both motors, or in some embodiments, an additional motor control component 50C may be implemented, each motor control component 50C controlling each motor. Further still, in an electric vehicle certain sensors 52 may not be needed, and electronic control component 50 may not receive certain ones of the illustrated inputs, e.g., engine rotation speed $N_E$.

An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and HEV travel modes. For example, engine control component 50A may control when engine 14 is started, e.g., when switching from EV travel mode to the engine-only travel mode or the HEV travel mode. This can occur when a hybrid vehicle is transitioning from the EV travel mode to the HEV travel mode. Likewise, engine control component 50A may control when engine 14 is shut off, e.g., when switching from engine-only or HEV travel mode to EV travel mode.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve resulting in an engine revolution speed $N_E$, and the supply of fuel to engine 14 is started via the output control device 14A.

When vehicle 10 is a hybrid vehicle to be operated in EV mode, as can be done when traveling downhill, for example, engine control component 50A outputs a control signal(s) to output control device 14A for stopping engine 14. Clutch 15 may be disengaged, and engine 14 is stopped. Moreover, output control device 14A may be commanded to stop the supply of fuel to engine 14.

As alluded to previously, clutch engagement control component 50B performs engagement control of the clutch 15 via the linear solenoid valve included in the hydraulic control circuit 40 by controlling current supplied to the linear solenoid valve. The hydraulic pressure supplied from the linear solenoid valve to the hydraulic actuator included in the clutch 15 as a result of the supplied current effectuates engagement/disengagement of the clutch 15.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that hybrid vehicle 10 decelerates.

In some embodiments, in order to optimize conditions for regenerative braking, vehicle 10, which may be a hybrid vehicle, may be downshifted to a lower gear to increase the magnitude of engine braking/regenerative braking. A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode (of a hybrid vehicle) established in vehicle 10 or on the basis of a target driving force, described below. A determination can be made regarding which travel mode (EV, engine-only, HEV) hybrid vehicle is in on the basis of, e.g., vehicle speed V, accelerator operation amount $A_{CC}$, battery SOC of battery 44, brake operation amount B, etc. For example, if the battery SOC of battery 44 indicates a low state of charge, travel mode determination component 50E may determine a need to switch from an EV/HEV travel mode to an engine-only travel mode. In some embodiments described below, travel mode determination component 50E is commanded to switch from an engine-only/HEV travel mode to an HEV/EV travel mode in order to purposely deplete battery 44 in anticipation of a road condition, e.g., an upcoming downhill grade.

A road conditions/location component 50G can make determinations regarding a location of vehicle 10, as well as upcoming road conditions. In one embodiment, road conditions/location component 50G may embody a navigation unit commonly found in many modern vehicles, hybrid or otherwise. Road conditions/location component 50G may receive information regarding road conditions from network interface device 48 and/or a GPS receiver, which may be one embodiment of a sensor 52. For example, the location of hybrid vehicle at any point during its travel can be determined, e.g., by the GPS receiver, and this location can be correlated with road conditions information relevant to that location.

For example, upon startup or during operation of vehicle 10, road conditions/location component 50G may determine a route to be traveled is known. The route may be known if an address, point of interest identifier, etc. is provided to a road conditions/location component 50G, for example, by a driver of vehicle 10, via navigation system user interface. Road conditions/location component 50G may have or receive maps or map information indicative of the route to be traveled along with road conditions, e.g., any uphill and/or downhill gradients present/expected along the route.

If the route is not known, road conditions/location component 50G may predict a route. Route prediction methods and systems are known in the art, and any of a variety of route prediction systems or methods can be used to predict the route in accordance with various embodiments. In some embodiments, the road conditions/location component 50G and/or the GPS receiver will predict one or more potential routes and a likelihood of each predicted route. For example, if the likelihood of a first route being correct is 80 percent (80%) and the likelihood for each of 4 other routes is 5 percent (5%), the road conditions/location component 50G can assume that the route will be the first route. Road conditions/location component 50G can, in conjunction with target driving force calculation component 50F, control the operation of engine 14 and/or motor 12 to deplete battery 44. This can be done, for example, to maintain a battery SOC in which battery 44 may always have capacity to receive regenerative braking energy when going downhill, and especially when going downhill towing a load.

As described in co-pending U.S. patent application Ser. No. 15/669,762, incorporated herein by reference in its entirety, target driving force calculation component 50F can determine whether or not battery 44 should be depleted in anticipation of an upcoming downhill grade. If the route is not known, road conditions/location component 50G may make calculations to determine an appropriate amount by which battery 44 should be depleted with regard to any/all/ the most likely/predicted routes having one or more downhill grades. Target driving force calculation component 50F may select or implement a particular battery depletion strategy appropriate to the route being traveled by hybrid vehicle as embodied by vehicle 10. In accordance with various embodiments, the determination of relevant vehicle mass and road load associated with vehicle 10 can be calculated. Based on these calculations, in addition to gradient information, potential kinetic available on a downgrade that can be recuperated by battery 44 can be accurately determined so as to preemptively deplete or discharge battery 44 to optimize a regenerative braking travel mode.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Road conditions/location component 50G may determine whether vehicle 10 is approaching a downgrade based on data stored in a memory (such as map data), data received via a network interface device 48 (such as streaming map data, periodic local travel information), or data detected by one or more sensors (such as an accelerometer, a camera or the like). Road conditions/location component 50G may determine whether data corresponding to the downgrade is known. For example, the data may include a grade (or multiple grades, also known as the slope or gradient) of the downgrade, a length of the downgrade, or other data characterizing the downgrade. Depending on how far away vehicle 10 is from the downgrade, as well as the aforementioned characteristics of the downgrade, target driving force calculation component 50F described below, can determine an appropriate amount by which to deplete battery 44. As previously noted, in some embodiments, a 3-axis accelerometer may be used to determine a current road gradient vehicle 10 is traversing based on, e.g., a determination regarding the amount of tilt experienced by vehicle 10. The amount of tilt can be a function of the road gradient, and thus can be used as an indicator of road gradient.

Target driving force calculation component 50F can calculate a target driving force on the basis of a vehicle state. For example, the target driving force calculation component 50F can deduce (calculate) a target driving force that is a target value of the driving force to be transmitted to wheels 34, e.g., on the basis of a detected accelerator operation amount $A_{CC}$, detected vehicle speed V, and the like. Target driving force calculation component 50F may output control signals to one or more of engine control component 50A and motor control component 50C to control the drive of engine 14 and the action of motor 12 to achieve the target driving force. In an engine-on/HEV mode, the engine control component 50A controls the drive of the engine 14 with the target driving force calculated by the target driving force calculation component 50F as the target engine output. In a EV/HEV mode, motor control component 50C controls driving motor 12 with the target driving force calculated by target driving force calculation component 50F.

As utilized herein, the target driving force of a hybrid vehicle may refer to power provided at engine 14 and/or motor 12, and calculated at wheels 34 based upon certain factors. As described below, these factors may include, e.g., a torque converter multiplication factor of torque converter 16, drivetrain/driveline efficiency factor, gear ratio of automatic transmission 18, the differential gear device 28, and radius of wheels 34.

A mass/road load determination component 50H can be used to determine a relevant vehicle mass which may include vehicle 10 and any load, e.g., a towed load, a passenger load, etc., as well as road load associated with vehicle 10. In accordance with various embodiments, mass/road load determination component 50H can be enabled to determine relevant vehicle mass and road load when vehicle 10 is operating in an EV mode (when vehicle 10 is a hybrid vehicle). If vehicle 10 is an electric vehicle, mass/road load determination component 50H may be enabled at all times, or used to make the requisite determinations without being dependent on a travel mode.

Figure 2:
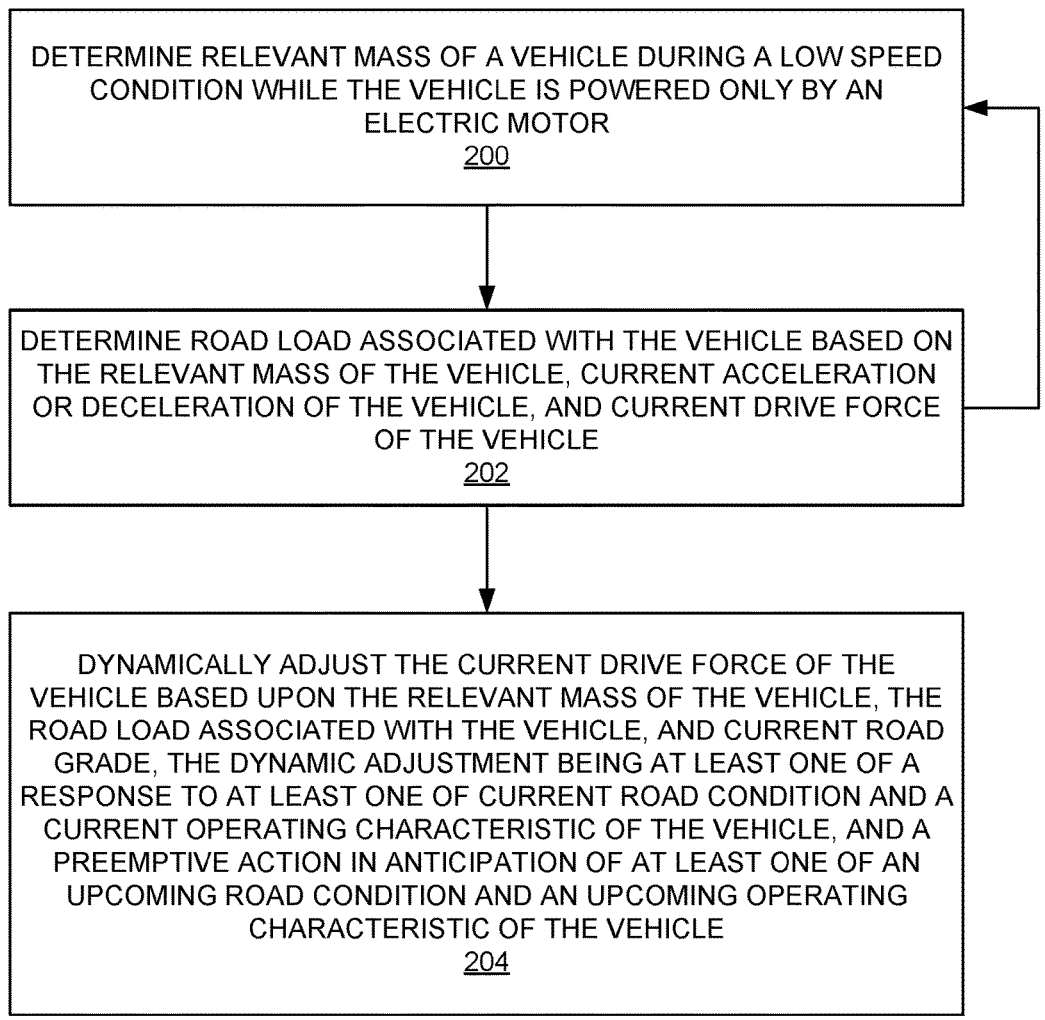
FIG. 2 is a flow chart illustrating example operations that can be performed to determine vehicle mass and road load in accordance with various embodiments of the present disclosure.

FIG. 2 is a high-level flow chart illustrating example operations that can be performed to adjust a current driving force based upon relevant vehicle mass and road load calculated when only a motor(s) is providing drive power. In a hybrid vehicle, this can occur when vehicle 10 is operating in an EV mode. In an electric vehicle, this is the standard operation mode of vehicle 10.

At operation 200, relevant mass of a vehicle is determined during a low speed condition while the vehicle is powered only by a motor. In some embodiments, a low speed may be a speed less than approximately 18 mph/30 kph. Making a relevant vehicle mass determination can be done when a vehicle, e.g., vehicle 10 is traveling at lower speeds to negate variables that may skew the relevant vehicle mass determination when the vehicle is traveling at higher speeds. For example, a more accurate determination of relevant vehicle mass can be made at lower speed because wind resistance is negligible, and can therefore be ignored. Moreover, the relevant vehicle mass determination can be performed while vehicle 10 is traveling on a relatively flat plane. However, as described below, based on road gradient information determined by the 3-axis accelerometer or received/determined by road conditions/location component 50, a correction factor can be applied, if the measurement is performed while vehicle 10 is traveling uphill or downhill.

$$Force_{drivetrain} = mass * acceleration$$

In some embodiments, the relevant mass of vehicle 10 can be determined based on the drivetrain force, e.g., torque at wheels 34, and the acceleration being experienced by vehicle 10. In some embodiments, the relevant vehicle mass includes the mass of hybrid vehicle 10 and that of a towed load, e.g., a trailer, being hauled by vehicle 10, a passenger load, etc. Torque at wheels 34 can be determined by receiving one or more signals from one of sensors 52 capable of determining the torque at wheels 34. In some embodiments, torque at wheels 34 can be calculated by determining torque output by motor 12 and multiplying that output torque by a torque multiplication factor of torque converter 16 in a current gear in which automatic transmission 18 is operating. In some embodiments, drivetrain deceleration force can be determined from an electronic braking controller (EBC) used to distribute force between regenerative braking and friction braking efforts. In some embodiments, the EBC relates a brake pedal request to a torque request at the wheels 34. This torque request may be met either through negative motor torque, through brake pressure being applied, or a combination of negative motor torque and brake pressure. It should be noted that this drivetrain deceleration force may be similar to drivetrain force because it is representative of the torque at the wheels. 34 Acceleration can be determined by the 3-axis accelerometer which may be embodied as one of sensors 52.

At operation 202, road load associated with the vehicle is determined based upon the mass of the vehicle, current acceleration or deceleration of the vehicle, and a current drive force of the vehicle. Road load can be determined while hybrid vehicle is traveling at relatively higher speeds in accordance with the following equation.

$$Force_{drivetrain} - Force_{road\_load} = mass * acceleration$$

Here, the force or resistance experienced by hybrid vehicle 10 can be calculated based on the previously calculated relevant mass of hybrid vehicle 10. That is, the drivetrain force can be calculated and acceleration can be determined as described above. Knowing the relevant mass of hybrid vehicle 10, the road load force can be determined. Road load can refer to the resistance experienced/force imparted by a vehicle while traveling at some constant speed over a level surface. The resistance can be attributed to various factors, including but not limited to, air resistance or drag, the resistance or friction of the wheels of the vehicle contacting the road, drivetrain losses, etc. A road load curve can be interpolated based upon the above calculations, so that at any speed or velocity, the road load associated with hybrid vehicle 10 can be determined. In some embodiments, road load is repeatedly calculated so as to build a road load profile that is more accurate, the more road load determinations are made. Road load can impact the target driving force inasmuch as it provides resistance that the target driving force must overcome and/or may add to negative target driving force.

At operation 204, the current drive force may be dynamically adjusted based upon the relevant vehicle mass, the road load associated with the vehicle, and a current road grade. The dynamic adjustment may be at least one of a response to at least one of a current road condition and a current operating characteristic of the vehicle. The dynamic adjustment may also be at least one of a preemptive action in anticipation of at least one of an upcoming road condition and an upcoming operating characteristic of the vehicle. For example, as described in U.S. patent application Ser. No. 15/669,832 (U.S. Pat. No. 10,300,907), incorporated herein by reference in its entirety, engine braking can be used to augment motor braking. In such a situation, relevant vehicle mass and road load associated with the vehicle can be used to characterize the operational characteristics of the vehicle, taking into account, e.g., gradient of a downhill slope. Determining relevant vehicle mass and road load in accordance with various embodiments can provide a more accurate characterization of the vehicle, as well as the effect of gravity. In turn, a determination regarding when and/or by how much an engine may need to augment motor braking when, e.g., a vehicle is towing a load and is traveling downhill can also be made more accurate. For example, without taking the effects of gravity into account, a calculated road load while the vehicle is traveling downhill may be lower than it should be. With this inaccurate road load determination, gear shift controller 50D may fail to shift vehicle 10 into a lower/low enough gear to maximize the effect of engine/motor braking. In other scenarios, failing to account for the effects of gravity can result in vehicle 10 being a gear lower than it needs to be when traveling uphill. In general, relying on an inaccurate road load profile for a vehicle can result in the target driving force calculation component 50F making an incorrect or non-optimal target driving force calculation such that vehicle 10 may be operating in a gear ratio lower/higher than it should be.

Figure 3:
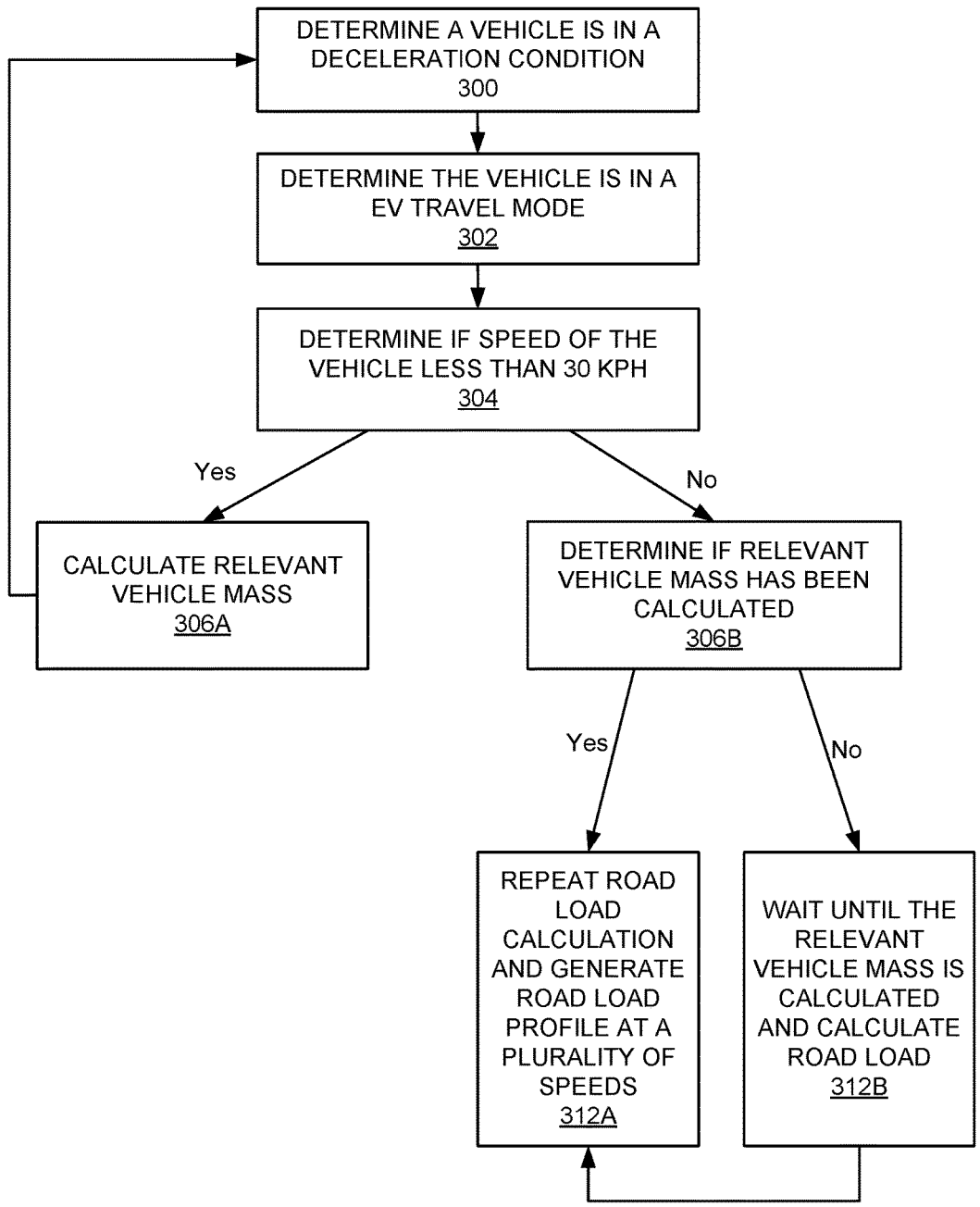
FIG. 3 is a flow chart illustrating example operations that can be performed to determine vehicle mass and road load during a deceleration condition.

FIG. 3 is a flow chart illustrating more detailed example operations that can be performed to determine relevant vehicle mass during a deceleration condition in accordance with various embodiments. At operation 300, a determination that a vehicle is in a deceleration condition can be made. For example, referring back to FIG. 1B, travel mode determination component 50E may receive signals from one or more of sensors 52 that the friction brakes and accelerator of vehicle 10 are released or in zero-state. Moreover, travel mode determination component 50E may determine that no drive power is being transmitted through the power transmission path of vehicle 10. This may signify a (coasting) deceleration condition. For example, travel mode determination component 50E can determine that the accelerator of hybrid vehicle 10 is released or in a zero-state, and no drive power is being transmitted through the power transmission path of hybrid vehicle 10, while the friction brakes have been actuated. This may also be indicative of a deceleration condition.

At operation 302, a determination can be made as to whether the vehicle is in an EV travel mode. Again, travel mode determination component 50F may make this determination. As alluded to above, relevant vehicle mass can be determined more accurately when making calculations based on motor operation rather than engine operation. For example, determining the driving force which can be used to determine the relevant vehicle mass, described below, the resulting calculation will be more accurate if based on an accurate driving force measurement.

At operation 304, the speed of the vehicle can be determined, e.g. by obtaining the vehicle speed V from a vehicle speed sensor. If the speed is determined to be less than approximately 18 mph/30 kph, for example, at operation 306A, the relevant mass of the vehicle can be calculated. It should be noted that the speed threshold indicative of a low speed of travel can vary in accordance with different embodiments. As described above, one reason for calculating the relevant vehicle mass as low speed is because wind resistance or drag can be ignored at lower speeds. Thus, the specification of a "low" speed can depend on the specific aerodynamics of a particular vehicle and the speed at which it can travel and be unaffected by wind resistance. Other determinative factors may be considered when specifying a low speed in accordance with other embodiments.

At operation 306A, if the speed of the vehicle is low, e.g., less than approximately 18 mph/30 kph, a relevant vehicle mass can be calculated. In some embodiments, the calculation of relevant vehicle mass based upon a grade correction factor is as follows. The term $A_{sensor}$ can refer to a current acceleration or deceleration rate determined by the 3-axis accelerometer described above.

The term $F_{drive}$ may come from the aforementioned EBC and is indicative of the relationship between brake stroke and deceleration.

$$F_{gravity} = Mass * \sin(\theta_{gravity}) * A_{gravity}$$

$$F_{drive} - F_{gravity} = Mass * A_{sensor}$$

$$F_{drive} - Mass * \sin(\theta_{gravity}) * A_{gravity} = Mass * A_{sensor}$$

$$F_{drive} = Mass(A_{sensor} + \sin(\theta_{gravity}) * A_{gravity})$$

$$Mass = F_{drive}/(A_{sensor} + \sin(\theta_{gravity}) * A_{gravity})$$

The grade correction factor may be a predetermined factor obtained from, e.g., a lookup table stored in local or remote memory and accessible by, e.g., mass/road load determination component 50H. If the vehicle is determined not to be on a grade, at operation 306A, the temporary mass determined based upon drivetrain force and acceleration can be set as the relevant vehicle mass. It should be noted that the relevant vehicle mass can be determined as part of an ongoing function. This can be done to eliminate or at least reduce error by gathering more data and refining the calculation(s). In some embodiments, a weighting mechanism can be used in conjunction with a trending mechanism such that the further away from a standard deviation a calculation may be, the less weight it is given. For example, a plurality of relevant vehicle masses may be calculated. If one or more of those calculations results in a relevant vehicle mass that is not in line with the other calculations, that determination of relevant vehicle mass can be disregarded. Thus, prior to reaching, e.g., a downgrade, relevant vehicle mass may be periodically calculated to arrive at a relevant vehicle mass that has some desired level of confidence. This relevant vehicle mass may then be used, as described herein, to optimize or preemptively adjust one or more operating conditions of the vehicle, e.g., downshifting gears by a proper amount to achieve a desired rate of deceleration. In some embodiments, when the relevant vehicle mass includes a towed load, such as a trailer, existence of the towed load can be confirmed with knowledge that a load is connected to the vehicle via, e.g., a pinned connecter and/or trailer switch.

Returning back to operation 304, if it is determined that the speed of the vehicle is approximately 18 mph/30 kph or more, another determination is made regarding whether the relevant vehicle mass has been calculated at operation 306B. If so, the calculation (described above) to determine road load associated with the vehicle can be repeated to generate a road load profile characterizing the road load across a plurality of speeds at operation 312A. Because an accelerometer, e.g., the 3-axis accelerometer, is used to determine the vehicle's acceleration at any point, road gradient can be determined at any point. In contrast to conventional systems and methods that rely on performing such calculations only during steady state (i.e., constant speed) conditions, various embodiments of the present disclosure can determine road load over time and over a greater variety of conditions. In this way, more road load data points can be obtained, and a more accurate road load curve can be generated.

It should be noted that above calculation used to determine road load is a general calculation. However, as also noted above, the road gradient can have an impact on road load. Accordingly, the following equations may be used to determine road load by taking into account the effect of gravity vis-à-vis road gradient. Again, $F_{drive}$ may be determined from the EBC in a deceleration scenario as follows.

$$F_{gravity}=Mass*sin(\theta_{gravity})*A_{gravity}$$

$$F_{drive}-F_{gravity}-F_{road\ load}=Mass*A_{sensor}$$

$$F_{road\ load}=F_{drive}-F_{gravity}-Mass*A_{sensor}$$

$$A_{sensor}=(F_{drive}-F_{road\ load})/Mass+F_{gravity}/Mass$$

$$F_{road\ load}=-Mass*A_{sensor}-F_{gravity}+F_{drive}$$

For example, when the vehicle is traveling a particular speed while descending a downgrade, the applicable wind resistance on the vehicle may be close to or equal that downhill force of gravity. In this case, the vehicle may decelerate at a desired rate without the driver having to actuate the friction brakes. However, at slower speeds, where wind resistance is not as great, the vehicle may experience unwanted acceleration due to gravity. By determining road load and knowing road gradient, preemptive engine/motor braking may be performed to decelerate the vehicle. The more accurate the determined road load is, the better an electronic control unit is able to determine the appropriate amount of preemptive engine/motor braking to apply.

If, at operation 306B, a determination is made that the relevant vehicle mass has not yet been calculated, at operation 312B, the process waits until the relevant vehicle mass is calculated, at which point, road load can be calculated.

Figure 4:
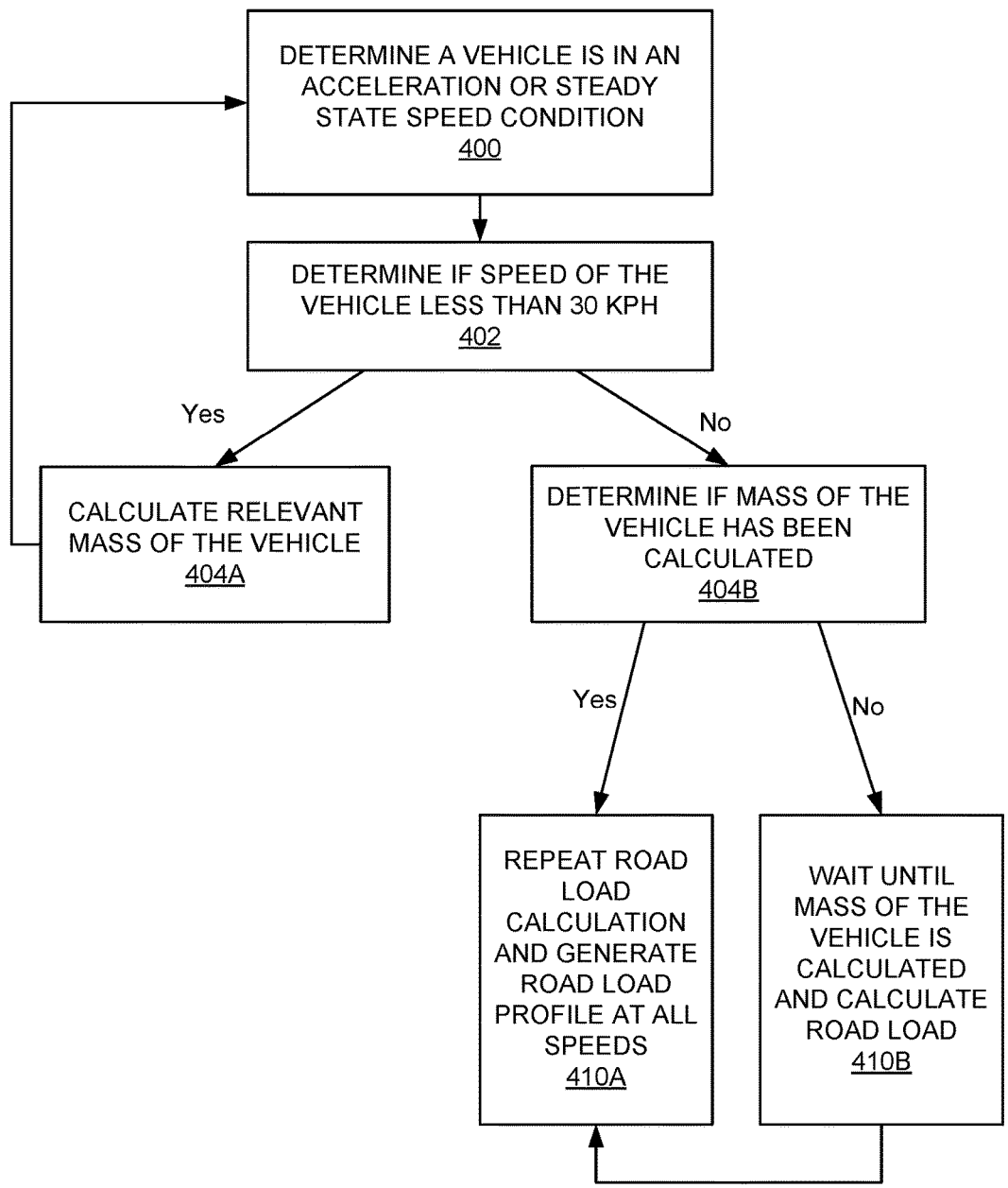
FIG. 4 is a flow chart illustrating example operations that can be performed to determine vehicle mass and road load during an acceleration or steady state condition.

FIG. 4 is a flow chart illustrating more detailed example operations that can be performed to determine relevant vehicle mass during an acceleration condition in accordance with various embodiments. At operation 400, a determination that a vehicle is in an acceleration or steady state condition can be made. It should be noted that (in accordance with the below equations), mass can be solved for both steady state and acceleration conditions, where the engine or motor is powering the vehicle, as opposed to the above deceleration scenario. For example, referring back to FIG. 1B, travel mode determination component 50E may receive signals from one or more of sensors 52 that the friction brakes are disengaged and accelerator of vehicle 10 is open. Moreover, travel mode determination component 50E may determine that the drive power being transmitted through the power transmission path of vehicle 10 is increasing. Alternatively, the 3-axis accelerometer may transit a signal(s) to travel mode determination component 50E that it is sensing acceleration.

At operation 402, the speed of the vehicle can be determined, e.g. by obtaining the vehicle speed V from a vehicle speed sensor. If the speed is determined to be less than approximately 18 mph/30 kph, for example, at operation, the relevant mass of the vehicle can be calculated. It should be noted that the speed threshold indicative of a low speed of travel can vary in accordance with different embodiments as discussed above.

At operation 404A, if the speed of the vehicle is low, e.g., less than approximately 18 mph/30 kph, a relevant vehicle mass can be calculated as follows.

$$F_{drive}=(Motor\ Torque)*TorqueCoverter\_multiplication*Driveline\_efficiency*gear\_ratio*diff\_ratio/tire\_radius$$

$$F_{gravity}=Mass*sin(\theta_{gravity})*A_{gravity}$$

$$F_{drive}-F_{gravity}=Mass*A_{sensor}$$

$$F_{drive}=Mass*sin(\theta_{gravity})*A_{gravity}=Mass*A_{sensor}$$

$$F_{drive}=Mass(A_{sensor}+sin(\theta_{gravity})*A_{gravity})$$

$$Mass=F_{drive}/(A_{sensor}+sin(\theta_{gravity})*A_{gravity})$$

For the reasons noted previously, and in the same or similar manner, the relevant vehicle mass can be determined as part of an ongoing function.

Returning back to operation 402, if it is determined that the speed of the vehicle is approximately 18 mph/30 kph or more, another determination is made regarding whether the relevant vehicle mass has been calculated at operation 404B. If so, the calculation (described above) to determine road load associated with the vehicle can be repeated to generate a road load profile characterizing the road load across a plurality of speeds at operation 410A. Because an accelerometer, e.g., the 3-axis accelerometer, is used to determine the vehicle's acceleration at any point, road gradient can be determined at any point. In contrast to conventional systems and methods that rely on performing such calculations only during steady state conditions, various embodiments of the present disclosure can determine road load over time and over a greater variety of conditions. In this way, more road load data points can be obtained, and a more accurate road load curve can be generated. The above-described equations used to determine road load force based on acceleration may be used here.

In view of the above, it should be understood that use of the 3-axis accelerometer is useful to assist in eliminating the impact of different road gradients. That is, the impact of gravity can be determined, so that even at higher speeds and/or during steady state conditions at higher speeds, the road load associated with a vehicle, e.g., vehicle 10 can be accurately calculated.

If, at operation 404B, a determination is made that the relevant vehicle mass has not yet been calculated, at operation 410B, the process waits until the relevant vehicle mass is calculated, at which point, road load can be calculated.

Because the calculation/determination of relevant vehicle mass and road load associated with a vehicle can be performed at any time, and indeed are repeatedly performed in some embodiments, these calculations/determinations may occur during/close to launch. For example, such calculations/determinations can be made every time a vehicle begins moving/as it moves after a stop. Accordingly, in some embodiments, launch inertia of a vehicle may be considered as it can impact the calculations/determinations.

Figure 5:
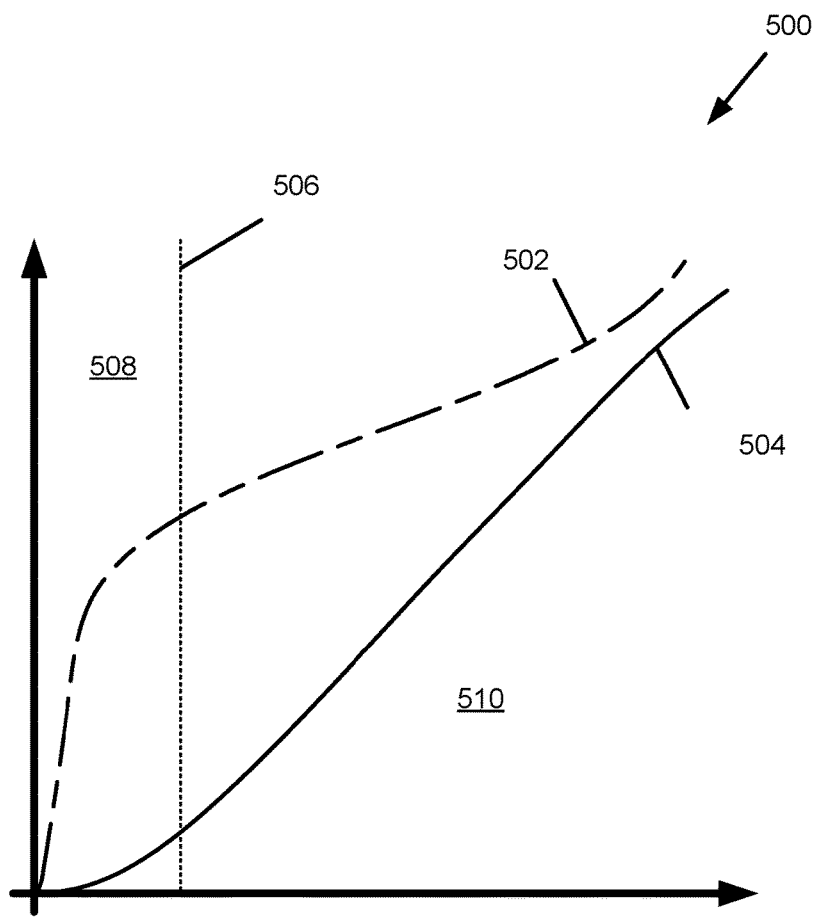
FIG. 5 is a graphical representation example conditions and factors that can impact relevant vehicle mass and road load determinations in accordance with various embodiments.

FIG. 5 illustrates an example graph 500 of these conditions/factors and how they can impact the above-described calculation/determination of relevant vehicle mass and road load. Line 502 can be representative of example engine speed of a vehicle over some time period. Line 504 can be representative of example turbine speed of the vehicle over that same time period. It should be understood that no values are presented inasmuch as FIG. 5 is merely intended to show engine and turbine speed relative to each other.

During launch, the inertia of a vehicle can be a consideration when calculating relevant vehicle mass when the vehicle is traveling at a lower speed. That is, the speed at launch may skew a speed determination at lower speeds. Moreover, the character of a torque converter differs at/subsequent to launch, and may also be a factor considered when calculating relevant vehicle mass. It should be noted that in some embodiments, the determination of relevant vehicle mass should not be performed until the torque converter is "taut." That is, in some embodiments, the torque converter can be referred to as being taut due to fluid coupling. Once the two speeds on either side of the torque converter start to converge, it is "taut." Between the two sides, there is no physical connection, and torque is transferred through the fluid coupling. Accordingly, calculations/determinations based on measured engine torque, drivetrain efficiency, e.g., the calculation of relevant vehicle mass during acceleration illustrated in FIG. 4 and described above, should be performed once the actual torque converter character is realized.

Similarly, the relatively fast/large increase in engine speed prior to the torque converter settling into a taut condition may also skew calculations/determinations based on vehicle speed, when vehicle speed is relatively low. Hence, speed in some embodiments, is determined after any impact initial launch inertia of the vehicle may have on that speed. For example measuring vehicle speed in area 508 may result in an inaccurately high value that is not indicative of the vehicle's actual speed (at least for the purposes of the above-described calculations/determinations). Accordingly, referring back to FIG. 1B, the target driving force calculation component 50F may determine that the impact of launch (described above) has passed based upon a preset or previously determined wait time. In some embodiments, the target driving force calculation component 50F may obtain signals indicative of, e.g., vehicle speed, acceleration, tilt/body roll, etc., from one or more sensors 52. This may be done to determine that any sudden jumps/increases in speed, acceleration, large variance in the tilt/body roll of vehicle 10 attributable to launch/launch inertia have passed.

In accordance with various embodiments, relevant vehicle mass, which can include any loads it is carrying (passengers, cargo, etc.) and/or towing (trailers and the like), is calculated when the vehicle is operating in an EV mode. Additionally, relevant vehicle mass can be determined continuously and/or multiple times over some time period. This provides for a more accurate determination of relevant vehicle mass compared to conventional techniques of measuring (or even simply assuming) relevant vehicle mass. Based on this determination, road load associated with the vehicle can be calculated, where road load can also be determined periodically/aperiodically to achieve better accuracy, not to mention being based on an already more accurate relevant vehicle mass determination.

Various embodiments disclosed herein are able to capture the dynamic nature of relevant vehicle mass and road load, not to mention taking into account factors, such as road gradient/gravity, vehicle speed, etc. Efforts to optimize operation and/or take preemptive action to provide more efficient performance, enhance the drive experience, etc. can be better achieved through more accurate calculations/determinations of relevant vehicle mass and road load. For example, in a towing condition, relevant vehicle mass can vary depending on vehicle operating conditions and road conditions, and the load can change also change vehicle dynamics. However, with accurate relevant vehicle mass and road load data, what a vehicle is/will be experiencing regardless of road conditions can be determined. Engine operation can be better controlled when traversing uphill as well as downhill grades. Better estimates of energy that can be recaptured during regenerative braking may be achieved. Shift schedules can be better optimized, as well as the deceleration conditions experienced by a vehicle, especially when switching travel modes, e.g., from engine-on to EV travel modes. For example, high relevant vehicle mass and low road load can result in acceleration during a downhill, coasting condition. Accordingly, adjusting applicable engine and/or motor torque to compensate can be optimized.

Figure 6:
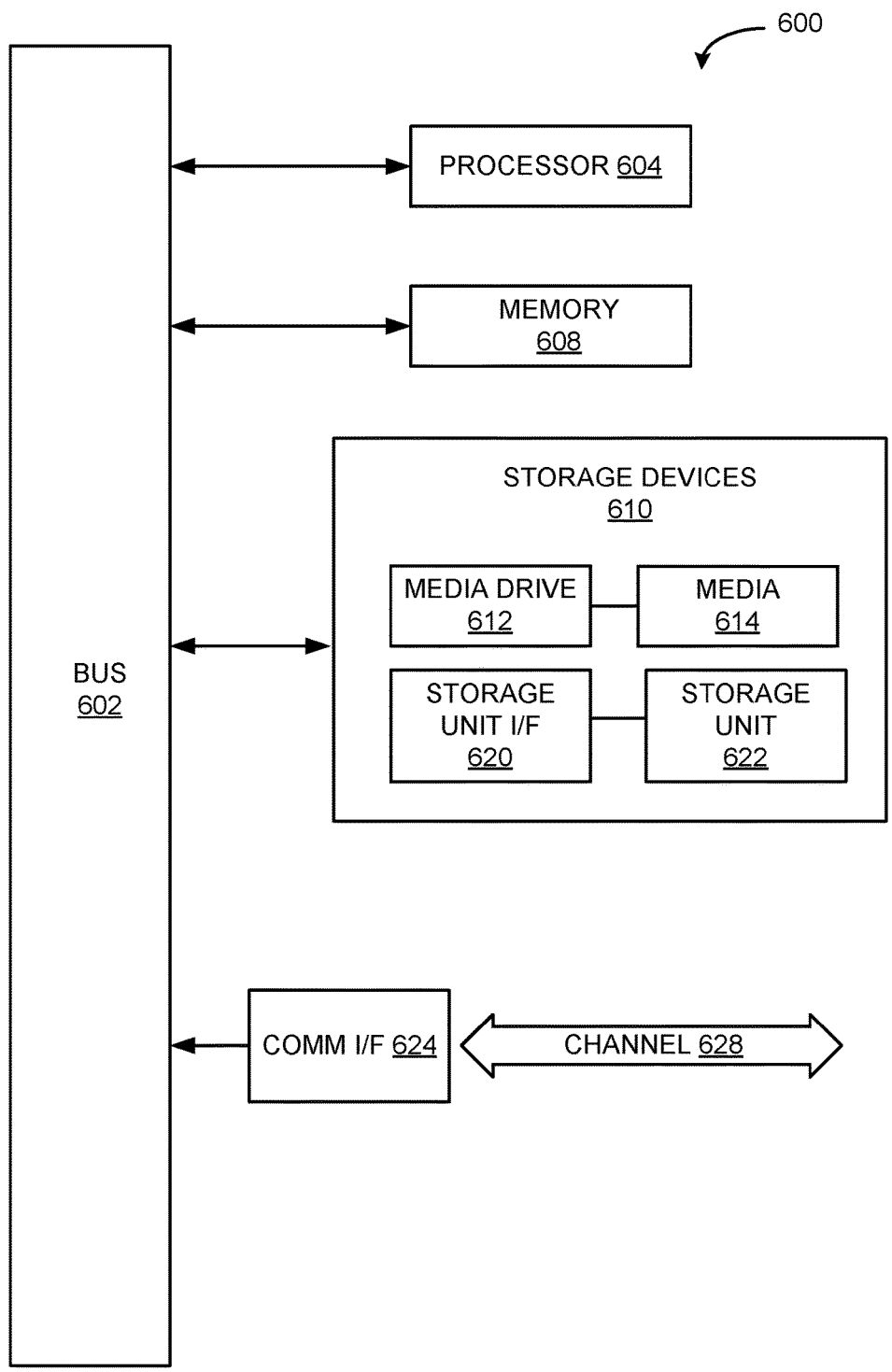
FIG. 6 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within computer processing units or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, electronic devices that might include some form of processing capability.

Computing component 600 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining relevant mass of a vehicle during a low speed condition while the vehicle is powered only by an electric motor, the low speed condition comprising a speed of the vehicle determined at a time when launch inertia no longer contributes to the speed of the vehicle;
   calculating road load associated with the vehicle based on the relevant mass of the vehicle, current acceleration or deceleration of the vehicle, and current drive force of the vehicle; and
   dynamically adjusting the current drive force of the vehicle based upon the relevant mass of the vehicle, the road load associated with the vehicle, and current road grade, the dynamic adjustment being at least one of a response to at least one of a current road condition and a current operating characteristic of the vehicle, and a preemptive action in anticipation of at least one of an upcoming road condition and an upcoming operating characteristic of the vehicle.

2. The method of claim 1, wherein the vehicle comprises a hybrid electric vehicle or an electric vehicle, and the hybrid electric vehicle further comprising an internal combustion engine.

3. The method of claim 1, wherein determining the relevant mass of the vehicle comprises calculating the relevant mass as a function of the current drive force generated by the electric motor and a current rate of acceleration or deceleration.

4. The method of claim 3, further comprising measuring the current drive force as a function of force due to negative motor torque and force due to friction braking while the vehicle is in a deceleration condition.

5. The method of claim 3, wherein determining the relevant mass of the vehicle further comprises determining whether the vehicle is traversing a graded condition.

6. The method of claim 5, further comprising obtaining and applying a road grade correction factor to the relevant mass by calculating force attributed to the grade and adding the force attributed to the grade to the current drive force generated by the electric motor upon a determination that the vehicle is traversing the grade.

7. The method of claim 6, wherein the low speed condition comprises a condition during which the vehicle is traveling below approximately 30 kilometers per hour.

8. The method of claim 5, further comprising utilizing the relevant mass of the vehicle as the relevant mass when dynamically adjusting the current drive force upon a determination that the vehicle is not traversing the grade.

9. The method of claim 1, further comprising determining the road load upon a determination that the vehicle is traveling above approximately 30 kph.

10. The method of claim 9, wherein determining the road load comprises calculating the road load as a function of the current drive force generated by the electric motor, the relevant mass of the vehicle, and force due to gravity.

11. The method of claim 1, further comprising determining the relevant mass of the vehicle while the vehicle is in an acceleration condition, and the vehicle is traveling at a speed less than approximately 30 kilometers per hour.

12. The method of claim 11, further comprising determining torque generated by the electric motor, and wherein the current drive force is calculated as a function of the torque generated by the electric motor, a torque multiplication factor associated with a gear ratio of a torque converter of the vehicle, a value indicative of drivetrain efficiency, the gear ratio, a differential gear ratio associated with a differential gear device of the vehicle, and a radius of a wheel of the vehicle.

13. The method of claim 12, further comprising, determining the torque generated by the electric motor subsequent to a launch condition at a time when the torque converter is in a taut state.

14. The method of claim 1, wherein the relevant mass of the vehicle comprises a mass of the vehicle and one or more loads, the one or more loads being at least one of carried and towed by the vehicle.

15. A vehicle, comprising:
   one or more electric motors; and
   an electronic control unit adapted to:
      determine that the vehicle is operating in a travel mode during which only the one or more electric motors are being used to drive the vehicle;
      determine a relevant mass of the vehicle after passage of a launch condition based upon the drive force generated by the one or more motors and calculated at the wheels of the vehicle; and
      determine a road load associated with the vehicle as a function of the relevant mass of the vehicle after passage of the launch condition.

16. The vehicle of claim 15, wherein the electronic control unit repeatedly determines the road load during operation of the vehicle, and based upon the repeated determinations, generates a road load profile for the vehicle, the determination of the road load being a function of gravitational impact on the vehicle in addition to being a function of the relevant mass of the vehicle.

17. The vehicle of claim 15, wherein the electronic control unit determines the relevant mass of the vehicle as a function of the drive force generated by the one or more motors and a rate of acceleration or deceleration of the vehicle if the vehicle is traveling a level section of road.

18. The vehicle of claim 15, wherein the electronic control unit determines the relevant mass of the vehicle as a function of the drive force generated by the one or more motors, a rate of acceleration or deceleration of the vehicle, and road gradient if the vehicle is traveling downhill.

* * * * *